United States Patent [19]

Satsurai

[11] Patent Number: 5,798,000
[45] Date of Patent: Aug. 25, 1998

[54] NON-ZINC CHLORIDE TYPE FLUX FOR TIN PLATING

[75] Inventor: Reika Satsurai, Tokai, Japan

[73] Assignee: Hoshizaki Denki Kabushiki Kaisha, Aichi-ken, Japan

[21] Appl. No.: 790,485

[22] Filed: Jan. 29, 1997

Related U.S. Application Data

[63] Continuation of Ser. No. 388,054, Feb. 10, 1995, abandoned.

[30] Foreign Application Priority Data

Feb. 10, 1994 [JP] Japan ................... 6-037918

[51] Int. Cl.⁶ .................................. B23K 35/34
[52] U.S. Cl. .................................. 148/26; 148/23
[58] Field of Search .................... 148/26, 23

[56] References Cited

U.S. PATENT DOCUMENTS

| | | | |
|---|---|---|---|
| 1,293,823 | 2/1919 | Luckey | 148/26 |
| 2,013,364 | 9/1935 | Simmons | 427/312 |
| 2,473,004 | 6/1949 | Boller | 148/26 |
| 2,788,303 | 4/1957 | Ballard | 148/20 |
| 3,988,175 | 10/1976 | Baker | 118/26 |
| 5,584,942 | 12/1996 | Satsurgi | 148/26 |

OTHER PUBLICATIONS

Lewis, "Notes on Soldering" p. 12 1948.
Hedges, Tin and It's Alloys pp. 164–165 1960.

*Primary Examiner*—Prince Willis, Jr.
*Assistant Examiner*—Robert R. Koehler
*Attorney, Agent, or Firm*—Hazel & Thomas

[57] ABSTRACT

A non-zinc chloride type flux applied for use in plating a substrate metal member with molten tin, containing at least one chemical compound selected from the group of stannous chloride, sodium chloride, potassium chloride and ammonium chloride and excluding zinc chloride therefrom. The flux is floated on the surface of molten tin in the plating process or used in a condition of solution before the substrate metal member is plated with molten tin.

5 Claims, 9 Drawing Sheets

FLUX No.1

Fig.1(a-1)
APPLIED WITH FLUX (BEFORE HEATING)

Fig.1(a-2)
APPLIED WITH FLUX

(AFTER MELTING)

Fig.1(b-1)
WITHOUT FLUX

(BEFORE HEATING)

Fig.1(b-2)
WITHOUT FLUX

(AFTER MELTING)

Fig. 2(a-1)
APPLIED WITH FLUX

(BEFORE HEATING)

Fig. 2(a-2)
APPLIED WITH FLUX

(AFTER MELTING)

Fig. 2(b-1)
WITHOUT FLUX

(BEFORE HEATING)

Fig. 2(b-2)
WITHOUT FLUX

(AFTER MELTING)

Fig.3(a)

FLUX No.1

Fig.3(b)

FLUX No.2

Fig.3(c)

FLUX No.3

Fig.3(d)

FLUX No.4

Fig.3(e)

FLUX No.5

Fig.3(f)

FLUX No.6

Fig.3(g)

FLUX No.7

Fig.3(h)

FLUX No.8

Fig.4(a)

FLUX No.1

Fig.4(b)

FLUX No.2

Fig.4(c)

FLUX No.5

Fig.4(d)

FLUX No.6

Fig.4(e)

FLUX No.7

Fig.4(f)

FLUX No.8

Fig.4(g)

FLUX No.9

Fig.5(a)

SUBSTRATE No.1

Fig.5(b)

SUBSTRATE No.2

Fig.5(c)

SUBSTRATE No.3

Fig.5(d)

SUBSTRATE No.4

Fig.5(e)

SUBSTRATE No.5

Fig.5(f)

SUBSTRATE No.6

Fig.5(g)

SUBSTRATE No.7

Fig. 6(a)

FLUX No.1

Fig. 6(b)

FLUX No.2

Fig. 6(c)

FLUX No.3

Fig. 6(d)

FLUX No.4

Fig. 6(e)

FLUX No.5

Fig. 6(f)

FLUX No.6

NON-ZINC CHLORIDE TYPE FLUX FOR TIN PLATING

This application is a Continuation of application Ser. No. 08/388,054, filed Feb. 10, 1995, now abandoned.

BACKGROUND OF THE INVENTION

1. Field of the Invention

The present invention relates to a non-zinc chloride type flux applied for use in plating a substrate metal member with molten tin and a method of using the flux in a tin plating process of the substrate metal member.

2. Discussion of the Prior Art

As one of conventional plating methods of plating a substrate metal member with molten tin, there has been proposed a plating method of plating a substrate metal member with tin by its immersion in molten tin in a plating bath. In this case, it is desirable to preliminarily treat the substrate metal member with a flux to enhance adhesiveness of the molten tin to the surface of the substrate metal member. For this purpose, a soldering flux consisting of a mixed salt of phosphoric acid, zinc chloride-ammonium chloride and the like has been proposed as the flux for tin plating.

In such a conventional plating method, however, the molten tin in the plating bath is easily oxidized, and the oxidized tin is formed as a slag layer on the surface of the molten tin. The layered slag of oxidized tin is entrapped into the molten tin in the plating bath when the substrate metal member is immersed therein. This deteriorates the quality of the treated products. For this reason, it is required to periodically remove the slag layer of oxidized tin formed on the surface of molten tin during the plating process of the substrate metal member. In addition, a portion of the molten tin may not be used due to oxidization thereof in the plating bath.

In the case that the substrate metal member is preliminarily treated by the conventional flux, the oxidized membrane of the substrate metal member is removed by the flux. However, if phosphoric acid is included in the flux, the temperature range for effecting reaction of the flux is limited, resulting in difficulty of adjustment of the plating temperature. In the case that the mixed salt of zinc chloride and ammonium chloride is utilized as the flux, the concentration of zinc metal at a crystal grain boundary and a joint interface in the plating layer increases, resulting in occurrence of corrosion along the crystal grain boundary and partial corrosion along the joint interface. The occurrence of such corrosion causes peeling off of the plating layer.

SUMMARY OF THE INVENTION

It is, therefore, a primary object of the present invention to provide a non-zinc chloride type flux applied in plating a substrate metal member with molten tin for overcoming the problems discussed above.

According to the present invention, the object is accomplished by providing a non-zinc chloride type flux applied for use in plating a substrate metal with molten tin, containing at least one chemical compound selected from the group of stannous chloride, sodium chloride, potassium chloride and ammonium chloride and excluding zinc chloride therefrom.

In the non-zinc chloride type flux, it is desirable that the component ratio of stannous chloride and sodium chloride or potassium chloride is determined in a range of 4:6–10:0.

In the plating process, the flux is floated on the surface of molten tin in a plating bath or used in a condition of solution before the substrate metal member is plated with molten tin.

Since the flux excludes zinc chloride therefrom, it is able to eliminate the occurrence of corrosion along a crystal grain boundary in the plating layer and the partial corrosion along a joint interface in the plating layer. In the case that the component ratio of stannous chloride and sodium chloride or potassium chloride is determined in a range of 4:6–10:0, the flux is very useful to restrain oxidization of the molten tin and to enhance the flux property and usability thereof. In the case that the flux is floated on the surface of molten tin in a plating bath, the surface of molten tin is covered with the flux to restrain the occurrence of slag thereon, and the flux absorbs undesired components from the molten tin to clean the plating bath. Since the substrate metal member is immersed in the molten tin through the floated flux in the plating process, the flux is adhered to the surface of the substrate metal member. In the case that the substrate metal member is immersed into the molten tin in the plating bath after being immersed in a solution of the flux, the surface of the substrate metal member is uniformly coated with the the flux, and the flux component entrapped into the molten tin is useful to restrain oxidization of the surface of the molten tin.

BRIEF DESCRIPTION OF THE DRAWINGS

For a better understanding of the present invention, and to show how the same may be carried into effect, reference will now be made, by way of example, to the accompanying drawings, in which:

FIG. 1(a-1) is a photograph showing the surface of tin applied with a flux before heating;

FIG. 1(a-2) is a photograph shown the surface of the tin in a molten condition;

FIG. 1(b-1) is a photograph showing the surface of tin without addition of the flux before heating;

FIG. 1(b-2) is a photograph showing the surface of the tin in a molten condition;

FIG. 2(a-1) is a photograph showing the bottom of the tin applied with the flux before heating;

FIG. 2(a-2) is a photograph showing the bottom of the tin in a molten condition;

FIG. 2(b-1) is a photograph showing the bottom of the tin without addition of the flux before heating;

FIG. 2(b-2) is a photograph showing the bottom of the tin in a molten condition;

DESCRIPTION OF THE PREFERRED EMBODIMENT

Figure 1:
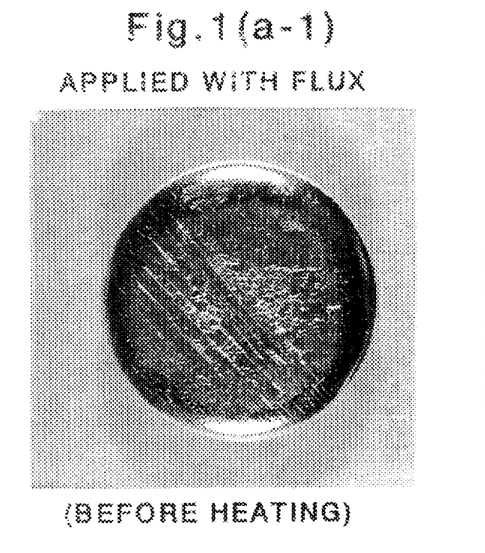
Figure 2:
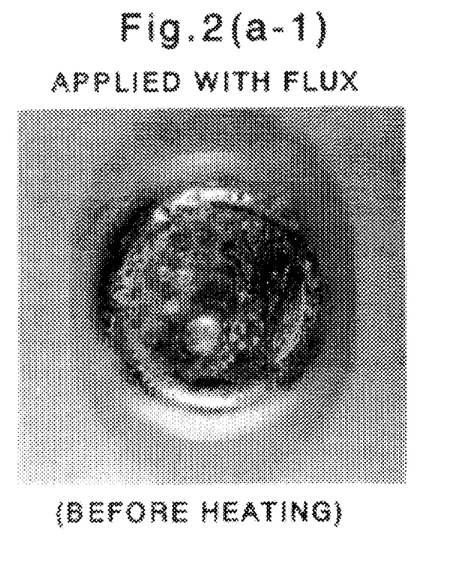
Figure 3A:
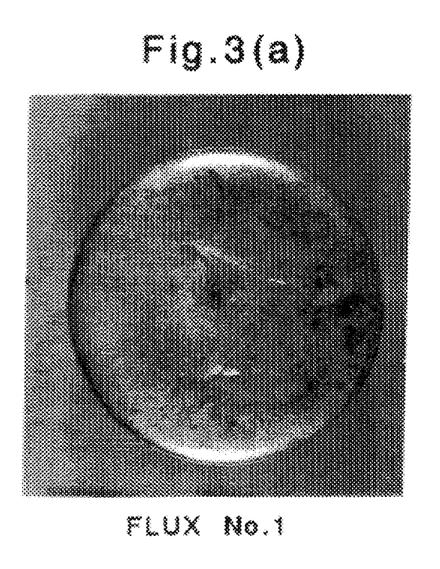
FIGS. 3(a) to 3(i) are photographs respectively showing the surface of molten tin for evaluation of the restraint property of oxidization in relation to a component ratio of the flux.
Figure 3B:
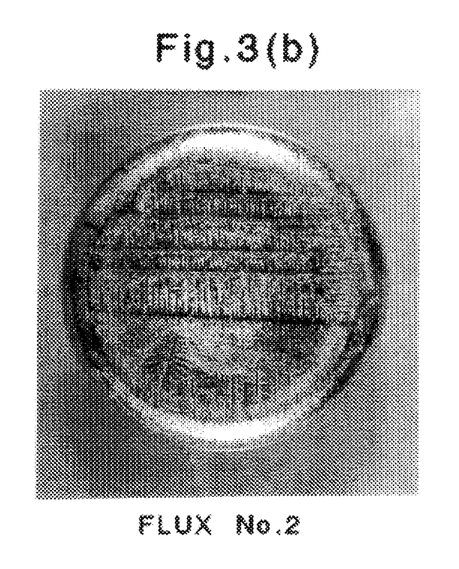
Figure 3C:
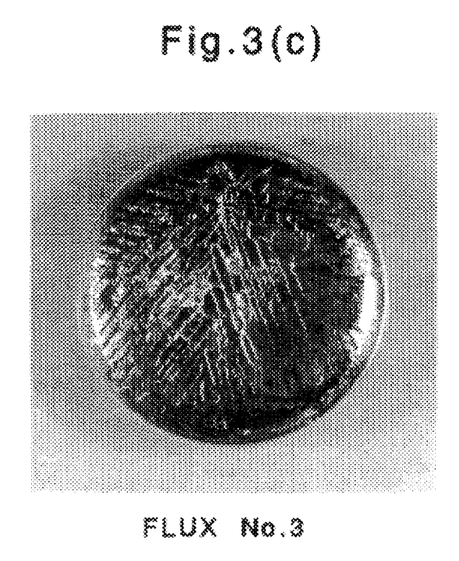
Figure 3D:
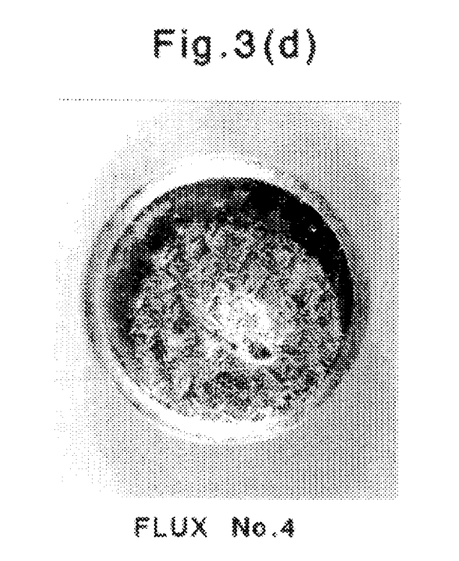
Figure 3E:
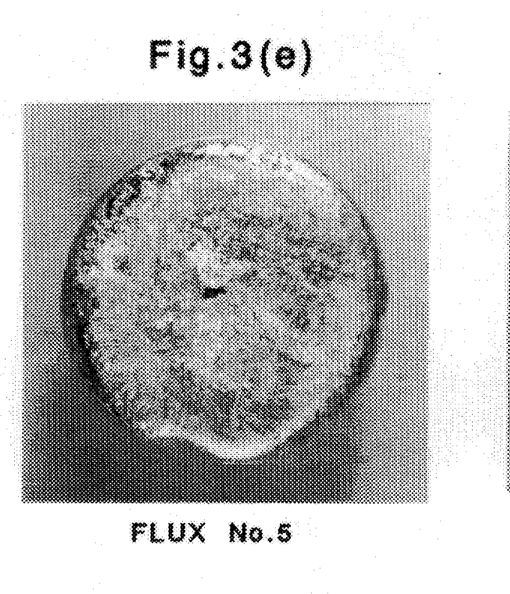
Figure 3F:
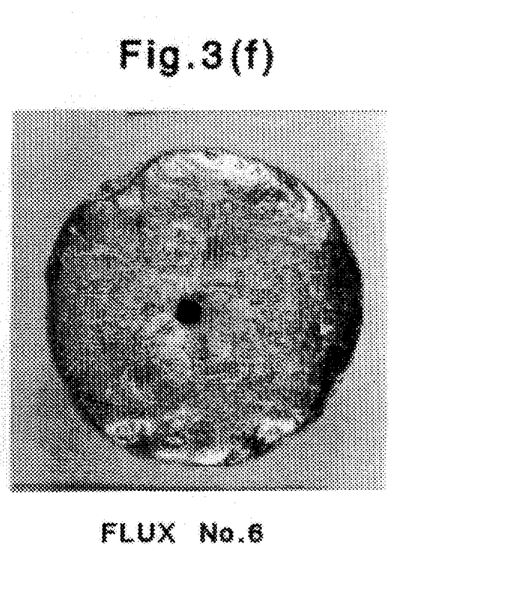
Figure 3G:
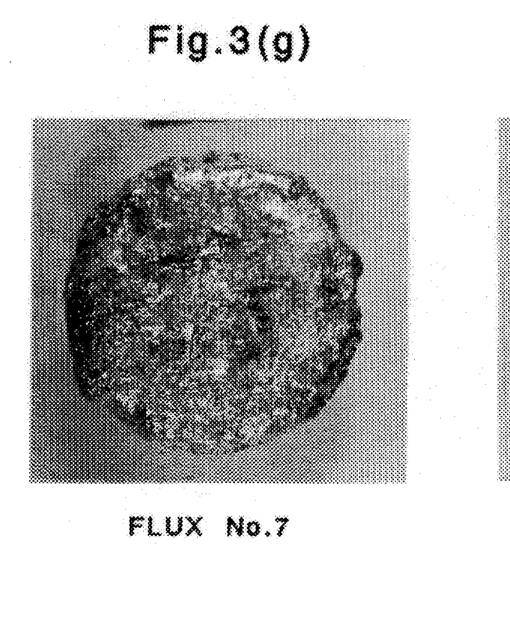
Figure 3H:
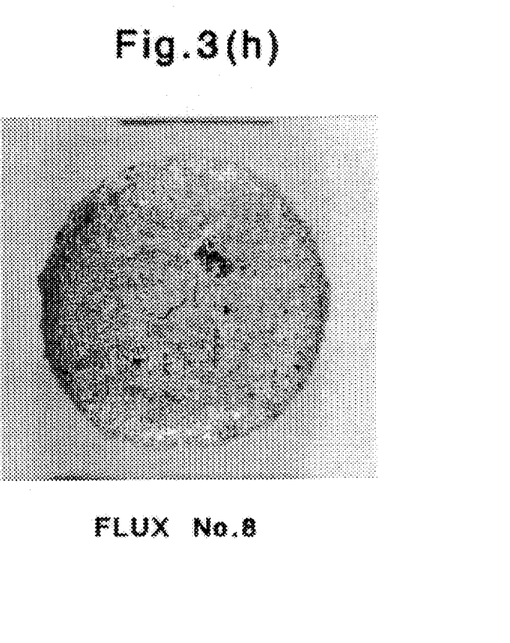
Figure 3I:
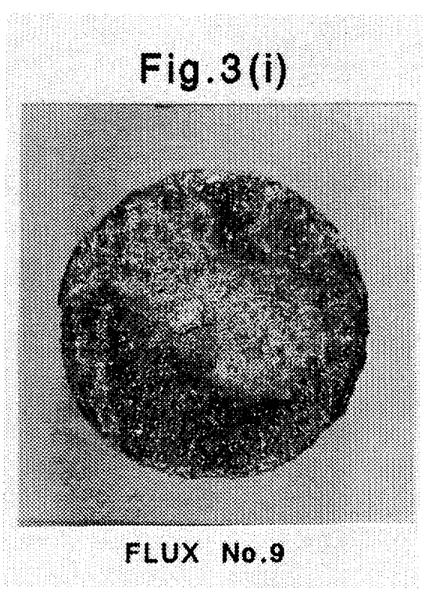
Figure 4A:
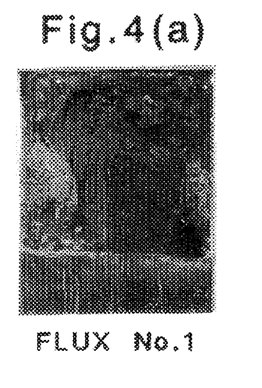
FIGS. 4(a) to 4(g) are photographs respectively showing the immersed surface of a substrate metal member for evaluation of the flux property.
Figure 4B:
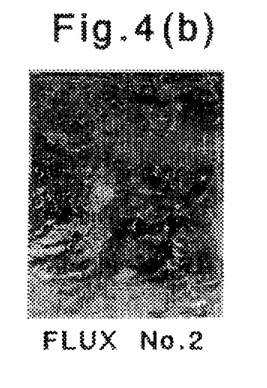
Figure 4C:
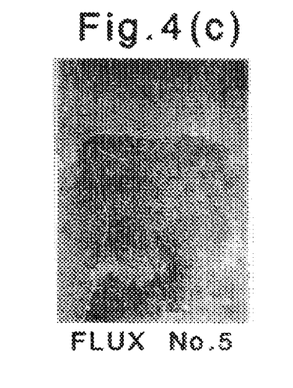
Figure 4D:
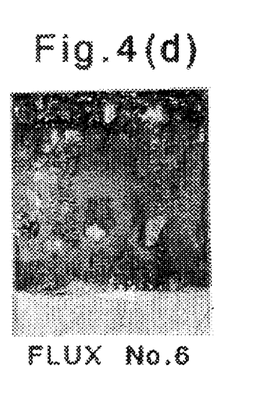
Figure 4E:
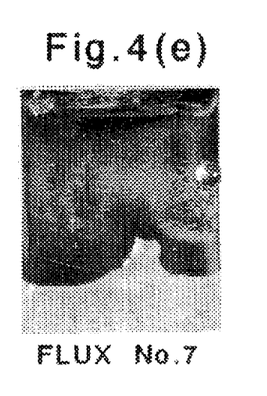
Figure 4F:
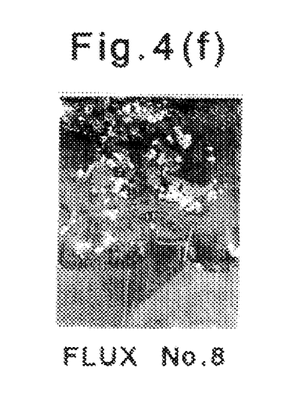
Figure 4G:
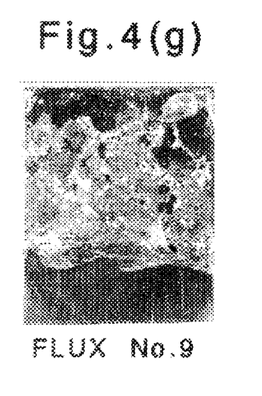
Figure 5A:
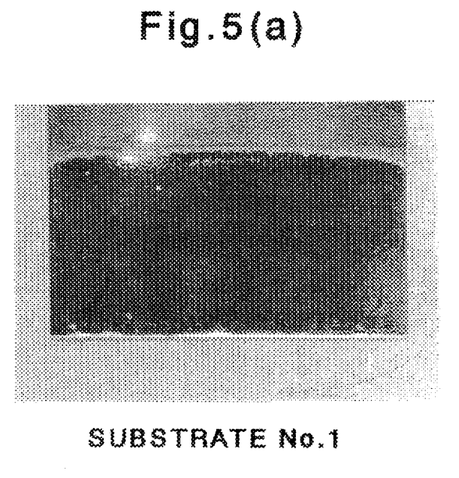
FIGS. 5(a) to (g) are photographs respectively showing the immersed surface of a substrate metal member for evaluation of the flux property in relation to the substrate metal member.
Figure 5B:
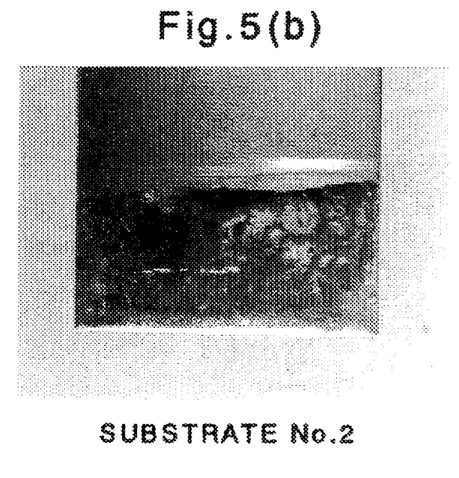
Figure 5C:
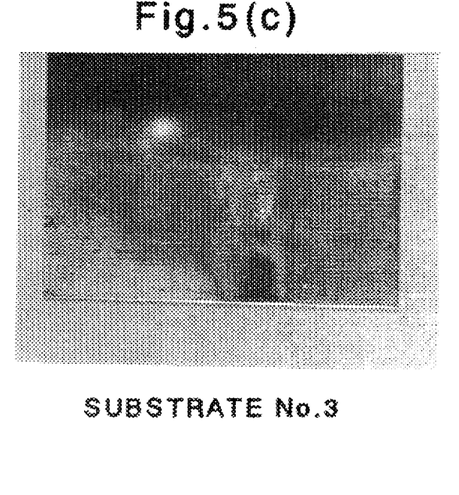
Figure 5D:
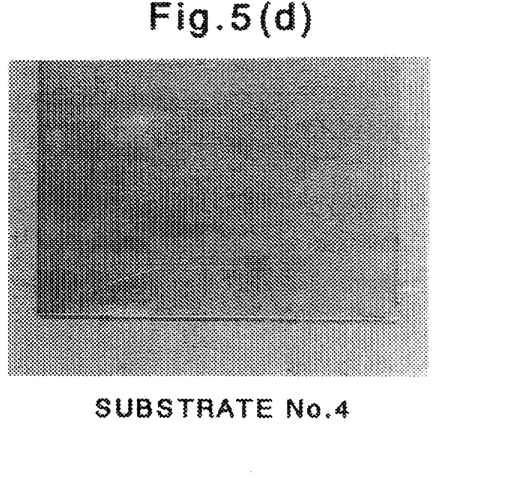
Figure 5E:
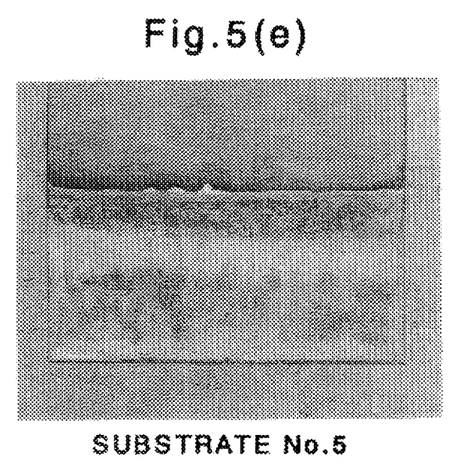
Figure 5F:
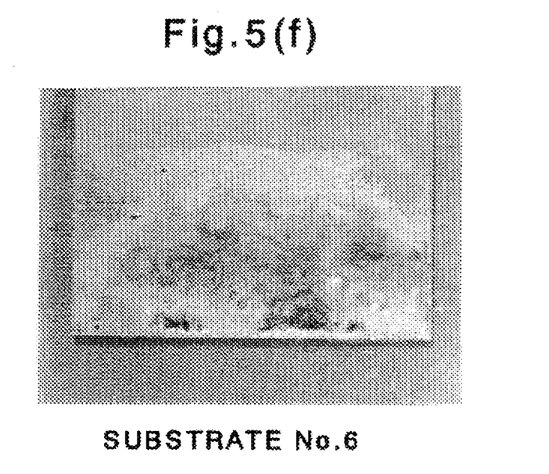
Figure 5G:
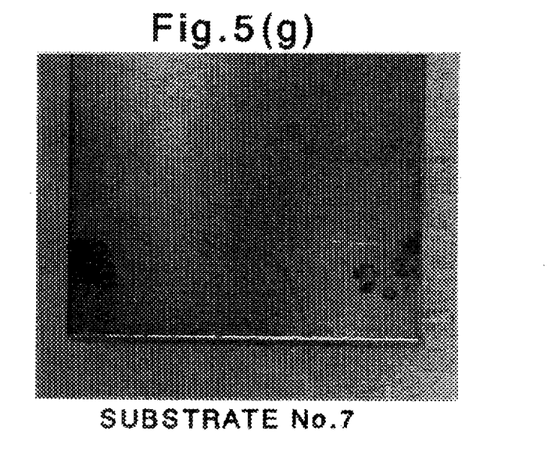
Figure 6A:
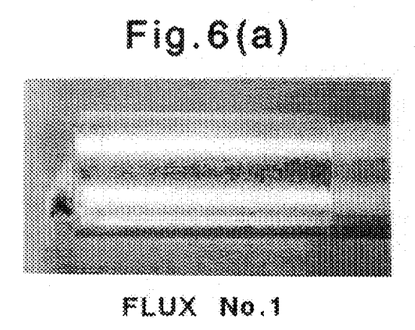
FIGS. 6(a) to f) are photographs respectively showing the immersed surface of a substrate metal member for evaluation of the flux property in relation to the component ratio of a flux solution.
Figure 6B:
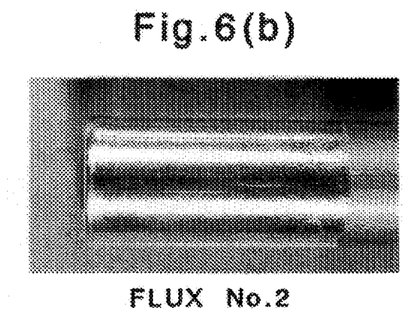
Figure 6C:
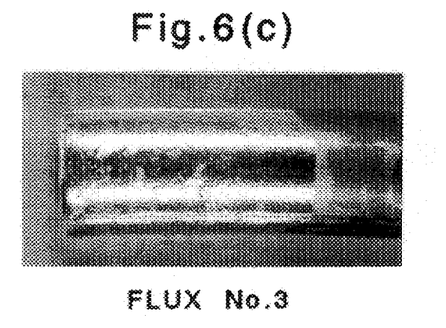
Figure 6D:
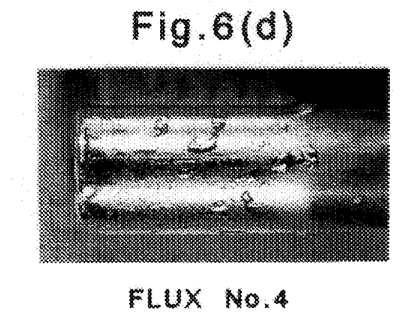
Figure 6E:
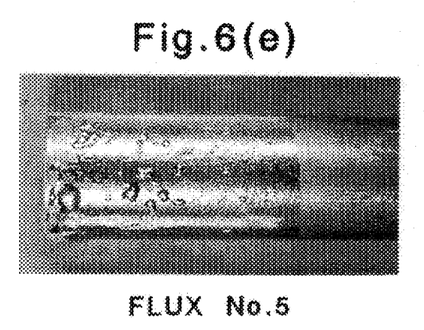
Figure 6F:
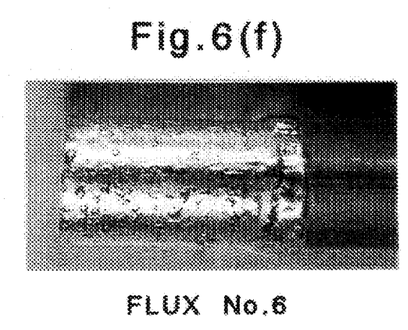

Experiment for evaluation of the restraint property of oxidization:

In this experiment, two magnetic pots were prepared, wherein 64 g of tin was stored in one of the pots and applied with the following 7 g of flux, while 57 g of tin was stored in the other pot without addition of the flux. Thus, the pots were heated in a heating furnace to melt the tin stored therein. Thereafter, the pots were held at 260° C. for thirty (30) minutes and cooled to observe an appearance of the surface and bottom of molten tin and to evaluate the occurrence of oxidization of the molten tin. As a result of the evaluation, any oxidized layer was not observed in both the pots before heating of the stored tin but a considerable amount of oxidized layer was observed on the surface of molten tin in the pot without addition of the flux after melting of the stored tin. Each appearance of the tin in the two pots is shown in photographs of FIGS. 1(a-1), 1(a-2) and 1(b-1), 1(b-2) where the pot applied with the flux is shown in FIGS. 1(a-1), 1(a-2) while the pot without addition of the flux is shown in FIGS. 1(b-1), 1(b-2).

The flux was prepared by mixing 10 g of $SnCl_2 \times 2H_2O$, 3 g of KCl and 2 ml of HCl (35 weight %), heating the mixture to vaporize water content therefrom and cooling the mixture.

Experiment for evaluation of the properties of the flux in relation to the component ratio:

In this experiment, a copper plate of 25 mm in width, 50 mm in length and 0.6 mm in thickness was used as a substrate metal member and plated with molten tin to evaluate the restraint property of oxidization, the flux property and the usability of the flux. In the plating process, a flux composed of $SnCl_2 \times 2H_2O$ and KCl was used as the flux. The component ratio of $SnCl_2 \times 2H_2O$ and KCl was determined as shown in the following Table 1.

TABLE 1

| Flux No. | SnCl2 | KCl | Restraint Property | Flux Property | Usability |
|---|---|---|---|---|---|
| 1 | 10 | 0 | O | O | O |
| 2 | 9 | 1 | O | O | O |
| 3 | 8 | 2 | O | O | O |
| 4 | 5 | 5 | O | O | O |
| 5 | 4 | 6 | Δ | O | X |
| 6 | 3 | 7 | Δ | Δ | X |
| 7 | 2 | 8 | Δ | Δ | X |
| 8 | 1 | 9 | Δ | X | X |
| 9 | 0 | 10 | X | X | X |

In the experiment, a number of magnetic pots were used and filled with 95.8 g tin, respectively. To each of the pots there was applied 5 g to 6 g of a flux having one of the component ratios in Table 1 and heated to melt the applied tin. After melting of the applied tin, the pots were further heated for fifteen (15) minutes. On the other hand, the copper plate was preliminarily heated on a hot plate at 100°–150° C. after being cleaned and immersed into a central portion of molten tin in the respective pots through the flux. After immersed in the molten tin for five (5) minutes, the copper plate was quickly lifted, cooled by air and cleaned by ultrasonic washing.

Thus, each appearance of the molten tin in the pots was observed to evaluate the restraint property of oxidization and the flux property, and the condition of the flux on the surface of the molten tin in the respective pots was observed to evaluate the usability of the flux. A result of the evaluation is shown in Table 1. Each appearance of the molten tin in the pots is shown by photographs in FIGS. 3(a) to 3(i). From the result of the evaluation, it has been confirmed that the component ratio of $SnCl_2$ and KCl for obtaining an excellent result in the foregoing three properties is in a range of 4:6–10:0, preferably 5:5–9:1. It has been also confirmed that the same component ratio can be adapted even if NaCL is substituted for KCl.

The criterion for evaluation of the restraint property of oxidization, the flux property and the usability was made as follows. In the evaluation of the restraint property of oxidization, the fact that the surface of tin presented metallic brilliance without any oxidized layer is represented by the character O, the fact that the surface of tin was partially covered with an oxidized layer is represented by the character Δ, and the fact that the whole surface of tin was covered with an oxidized layer without presence of metallic brilliance is represented by the character X. In the evaluation of the flux property, the fact that the copper plate was covered with smooth brilliant tin without any defects such as pin holes its immersed surface, lack of wetting, repellence of tin, etc. is represented by the character O, the fact that the immersed surface of the copper plate was in a dewetting condition is represented by the character Δ, and the fact that the body of the copper plate was exposed due to such defects as pin holes in its immersed surface, lack of wetting, repellence of tin, etc. is represented by the character X. In the evaluation of the usability of the flux, the fact that the flux was molten before melting of the tin in the pot and covered the surface of tin is represented by the character O, the fact that the surface of tin could not be fully covered with the molten flux since the melting temperature of the flux was equal to or slightly higher than the melting temperature of tin is represented by the character Δ, and the fact that the flux was not molten after melting of the tin in the pot and remained in a solid condition on the surface of tin is represented by the character X.

Experiment for evaluation of the flux property for various substrate metal members:

In this experiment, a flux composed of 10 g SnCl2 2H2O of, 3 g of KCl, 2 ml of HCl (35 weight %) was prepared by the preparation method described above and used to evaluate the flux property for various substrate metal plates listed below.

No. 1: A copper plate (50×50×0.6 mm).

No. 2: A nickel plate Clad-SUS 304 (50×50×0.6 mm)

No. 3: A stainless steel plate SUS 430 (50×50×0.6 mm).

No. 4: A stainless steel plate SUS 304 (50×50×0.3 mm)

No. 5: A zinc sheet metal SGCC F06 (50×50×0.6 mm)

No. 6: An aluminum plate A1100P (50×50×1.0 mm)

No. 7: A titanium plate (50×50×1.0 mm)

In this experiment, a magnetic pot was filled with an amount of tin and applied with the flux. Subsequently, the magnetic pot was heated in a heating furnace to melt the tin and further heated for fifteen (15) minutes. On the other hand, the substrate metal plates were cleaned and heated on a hot plate at 100°–150° C. Thereafter, the heated substrate metal plates were immersed in the molten tin through the flux. After being immersed for five (5) minutes, the substrate metal plates were quickly lifted, cooled by air and cleaned by ultrasonic washing. Thus, each appearance of the substrate metal plates plated with molten tin were observed to evaluate the flux property. In the evaluation of the flux property, the fact that the surface of the substrate metal plate was covered with smooth brilliant tin without any defects such as pin holes in its immersed surface, lack of wetting, repellence of tin, etc. is represented by the character O. The fact that the body of the substrate metal plate was exposed due to such defects as pin holes in its immersed surface, lack of wetting, repellence of tin, etc. is represented by the character Δ. A result of the evaluation is shown in the following Table 2, and each appearance of the plated substrate metal plates is shown by photographs in FIGS. 5(a) to 5(g).

TABLE 2

| Plate No. | Kind | Flux Property |
| --- | --- | --- |
| No. 1 | Copper plate | O |
| No. 2 | Nickel plate | O |
| No. 3 | Stainless plate SUS 403 | X |
| No. 4 | Stainless plate SUS 304 | X |
| No. 5 | Zinc sheet metal | X |
| No. 6 | Aluminum plate | X |
| No. 7 | Titanium plate | X |

Experiment for evaluation of the flux property in relation to the component ratio of a flux solution:

In this experiment, a flux solution was used to evaluate the flux property in relation to the component ratio of the flux solution. As a substrate metal member, a copper pipe of 15.88 mm in diameter, 1.0 mm in thickness and 50 mm in length was used, and each flux listed in the following Table 3 was used in a condition dissolved in a solution of $NH_4Cl$ of 0.55 g, HCl (36 weight %) of 1 ml and $H_2O$ of 42 g.

TABLE 3

| Flux No. | $SnCl_2$ $H_{2O}$ | KCl | Flux Property |
| --- | --- | --- | --- |
| 1 | 10 (16.7 g) | 0 (0 g) | O |
| 2 | 8 (13.4 g) | 2 (3.3 g) | O |
| 3 | 6 (10.0 g) | 4 (6.7 g) | Δ |
| 4 | 4 (6.7 g) | 6 (10.0 g) | Δ |
| 5 | 2 (3.3 g) | 8 (13.4 g) | X |
| 6 | 0 (0 g) | 10 (16.7 g) | X |

In the experiment, an amount of tin was stored in a magnetic pot, melted by heating and cleaned by a cleaner of the non-ion type containing hydroxycarboxylic acid as a main component. Thus, the copper pipe immersed in the flux solution was immersed in the molten tin in the pot for five (5) minutes. Thereafter, the copper pipe was lifted from the pot and cleaned by ultrasonic washing after cooled by air. Thus, the appearance of the copper pipe plated with molten tin was observed to evaluate the property of the respective fluxes. In the evaluation of the flux property, the fact that the copper pipe was covered with smooth brilliant tin without any defects such as pin holes in its immersed surface, lack of wetting, repellence of tin, etc. is represented by the character O, the fact that the immersed surface of the copper pipe was in a dewetting condition is represented by the character Δ, and the fact that the body of the copper pipe was exposed due to presence of pin holes in its immersed surface, lack of wetting, repellence of tin is represented by the character X. A result of the evaluation is shown in Table 3 and shown by photographs in FIGS. 6(a) to 6(f). From these results, it has been confirmed that the component ratio of $SnCl_2$ and KCl for obtaining an excellent flux property in a condition of solution is in a range of 4:6–10:0, preferably 8:2–10:0. It has been also confirmed that the same component ratio can be adapted even if NaCl is substituted for KCL.

What is claimed is:

1. A flux for use in coating a copper or nickel containing substrate metal with molten tin, consisting essentially of stannous chloride ($SnCl_2$ $2H_2O$) and at least one chloride salt selected from the group consisting of sodium chloride and potassium chloride, excluding zinc chloride therefrom, wherein the ratio of stannous chloride to said at least one chloride salt is 4:6–9:1.

2. The flux according to claim 1 wherein the ratio of stannous chloride to said at least one chloride salt is 5:5–9:1.

3. The flux according to claim 1 wherein the ratio of stannous chloride to said at least one chloride salt is 8:2–9:1.

4. The flux according to claim 1 wherein said chloride salt is sodium chloride.

5. The flux according to claim 1 wherein said chloride salt is potassium chloride.

* * * * *